United States Patent
Alshawaf et al.

(10) Patent No.: US 10,662,763 B2
(45) Date of Patent: *May 26, 2020

(54) MEASURING TRANSMISSIVITY OF WELLS FROM MULTIPLE LOGS

(71) Applicant: Saudi Arabian Oil Company, Dhahran (SA)

(72) Inventors: Mohammed H. Alshawaf, Dhahran (SA); Lewis M. Warlick, Dhahran (SA); Fahad A. Al-Ajmi, Dhahran (SA)

(73) Assignee: Saudi Arabian Oil Company

( * ) Notice: Subject to any disclaimer, the term of this patent is extended or adjusted under 35 U.S.C. 154(b) by 0 days.

This patent is subject to a terminal disclaimer.

(21) Appl. No.: 14/034,040

(22) Filed: Sep. 23, 2013

(65) Prior Publication Data

US 2014/0025303 A1    Jan. 23, 2014

Related U.S. Application Data

(63) Continuation of application No. 12/987,526, filed on Jan. 10, 2011, now abandoned.

(51) Int. Cl.
*E21B 47/00* (2012.01)
*E21B 47/12* (2012.01)
*G01V 11/00* (2006.01)
*E21B 47/10* (2012.01)
*E21B 43/00* (2006.01)

(52) U.S. Cl.
CPC .............. *E21B 47/12* (2013.01); *E21B 43/00* (2013.01); *E21B 47/00* (2013.01); *E21B 47/10* (2013.01); *G01V 11/00* (2013.01)

(58) Field of Classification Search
CPC ......... G01V 11/00; E21B 47/00; E21B 47/12; E21B 47/10; E21B 43/00
USPC ............................................. 702/11
See application file for complete search history.

(56) References Cited

U.S. PATENT DOCUMENTS 3,771,360 A   11/1973  Prats
4,348,897 A    9/1982  Krauss-Kalweit
(Continued)

FOREIGN PATENT DOCUMENTS

EP      1158312 A1    11/2001
WO   2009048781 A1     4/2009

OTHER PUBLICATIONS

Definition from Petropedia—What is Production Logging Tool (PLT), https://www.petropedia.com/definition/2928/production-logging-tool-plt (Year: 2019).*

(Continued)

*Primary Examiner* — Yoshihisa Ishizuka
(74) *Attorney, Agent, or Firm* — Bracewell LLP; Constance G. Rhebergen; Christopher L. Drymalla (57) ABSTRACT

Models of fluid flow in wells in formation of a subsurface earth reservoir are formed by computers based on measurements obtained by well logging tools run in the wells and measurements of formation rock characteristics obtained from laboratory data. The models so formed are used to form measures of injection/production profiles and assist reservoir engineers in allocation of production and injection wells for the reservoir, and in other reservoir production planning and analysis.

9 Claims, 9 Drawing Sheets

(56) References Cited

U.S. PATENT DOCUMENTS

| | | | | |
|---|---|---|---|---|
| 4,692,908 | A * | 9/1987 | Ekstrom | E21B 47/082 |
| | | | | 324/355 |
| 5,502,686 | A * | 3/1996 | Dory | G01V 11/00 |
| | | | | 175/40 |
| 5,812,068 | A * | 9/1998 | Wisler | E21B 7/068 |
| | | | | 175/40 |
| 6,023,164 | A * | 2/2000 | Prammer | 324/303 |
| 6,140,817 | A | 10/2000 | Flaum et al. | |
| 6,295,504 | B1 | 9/2001 | Ye et al. | |
| 6,477,469 | B2 * | 11/2002 | Ye et al. | 702/11 |
| 6,498,989 | B1 | 12/2002 | Pisetski et al. | |
| 7,805,982 | B2 | 10/2010 | Hilab | |
| 7,809,537 | B2 | 10/2010 | Hemanthkumar | |
| 7,853,045 | B2 | 12/2010 | Touati et al. | |
| 8,235,117 | B1 * | 8/2012 | Hill et al. | 166/303 |
| 2003/0075328 | A1 | 4/2003 | Challacombe | |
| 2003/0094040 | A1 | 5/2003 | Proett et al. | |
| 2004/0055745 | A1 | 3/2004 | Georgi et al. | |
| 2005/0171699 | A1 * | 8/2005 | Zazovsky et al. | 702/11 |
| 2007/0162235 | A1 | 7/2007 | Zhan et al. | |
| 2007/0289740 | A1 * | 12/2007 | Thigpen | E21B 37/06 |
| | | | | 166/250.01 |
| 2008/0154509 | A1 * | 6/2008 | Heaton | G01V 11/00 |
| | | | | 702/7 |
| 2009/0164125 | A1 | 6/2009 | Bordakov et al. | |
| 2009/0288881 | A1 | 11/2009 | Mullins et al. | |
| 2009/0316528 | A1 * | 12/2009 | Ramshaw | E21B 44/00 |
| | | | | 367/83 |
| 2010/0123461 | A1 * | 5/2010 | Folberth et al. | 324/339 |
| 2010/0127701 | A1 * | 5/2010 | Wichers | G01V 11/00 |
| | | | | 324/303 |
| 2010/0274490 | A1 * | 10/2010 | Gok | E21B 49/008 |
| | | | | 702/12 |
| 2010/0300682 | A1 * | 12/2010 | Thakur et al. | 166/250.01 |
| 2011/0214878 | A1 * | 9/2011 | Bailey | E21B 7/00 |
| | | | | 166/369 |
| 2012/0035896 | A1 * | 2/2012 | Wu et al. | 703/2 |
| 2012/0179379 | A1 * | 7/2012 | Alshawaf et al. | 702/9 |
| 2013/0282291 | A1 * | 10/2013 | Dasgupta | G01V 1/30 |
| | | | | 702/13 |
| 2014/0025302 | A1 * | 1/2014 | Alshawaf et al. | 702/9 |
| 2014/0025360 | A1 * | 1/2014 | Alshawaf et al. | 703/10 |

OTHER PUBLICATIONS

International Search Report and Written Opinion for Related PCT Application PCT/US2012/020323, dated Jun. 14, 2012.

Dogru et al., "A Massively Parallel Reservoir Simulator for Large Scale Reservoir Simulation", SPE 51886, Feb. 1999, Houston Texas.

Dogru et al., "Simulation of Super K Behavior in Ghawar by a Multi-Million Cell Parallel Simulator", SPE 68066, Mar. 2001.

Feth et al., "Lake Bonneville: Geology and Hydrology of the Weber Delta District, Including Ogden, Utah", 1996, pp. 1-91.

Heceman, P. et el; "Production Logging for Reservoir Testing"; Schlumberger, Oilfield Review, vol. 9; Issue 2; Jun. 1997, pp. 16-20.

European Extended Search Report dated Mar. 24, 2016 in corresponding European application No. 15196092.9 (SA5211/EP); pp. 1-6.

Kabir, C.S. et al; "Obtaining Reservoir Parameters and Flow Profiles From Production-Logging Runs" Society of Petroleum Engineers, SPE 49537; Abu Dhabi International Petroleum Exhibition and Conference, Abu Dhabi, UAE, Oct. 11, 1998; pp. 1-8.

Oilfield Glossary: Term "relative permeability", Schlumberger Limited, Oilfield Services, available as of Mar. 18, 2014 at: http://www.glossary.oilfield.slb.com/en/Terms/r/relative_permeability.aspx, 2005, p. 1.

* cited by examiner

MEASURING TRANSMISSIVITY OF WELLS FROM MULTIPLE LOGS

CROSS-REFERENCE TO RELATED APPLICATIONS

The present application is a continuation of, and claims priority to, commonly owned U.S. patent application Ser. No. 12/987,526, filed Jan. 10, 2011.

BACKGROUND OF THE INVENTION

1. Field of the Invention

The present invention relates to computerized simulation of hydrocarbon reservoirs in the earth, and in particular to forming models of flow profiles of fluids in wells in subsurface earth formations based on data obtained from well logging tools and laboratory data.

2. Description of the Related Art

In production from subsurface hydrocarbon reservoirs or fields, it has been important to efficiently and effectively allocate wells which were to be used as production wells and wells which were to be used as injection reservoirs in order to optimize hydrocarbon production. This was particularly the case for large reservoirs with a number of wells. It was also particularly the case in connection with fields where the wells were horizontal wells. In such cases, it was desirable to know the flow profiles of the formations between the wells. The flow profile is a measure of the in situ flow rate of the formation at a particular depth or location in the well.

A well logging tool known as a production logging tool (or PLT) was often used for evaluating wells to determine the flow profiles of the formations where the wells were located. However, a production logging tool run was expensive and time consuming. In addition selection among wells in a reservoir or formation of wells as candidates for a production logging tool run had to be made on the basis of data from other, earlier logs together with estimates and intuition based on subjective prior experience. Also, for those wells in which a production logging tool run was not run and PLT data thus unavailable, analysis of the subsurface formation flow was based on data available from the other, earlier logging tool runs.

SUMMARY OF THE INVENTION

Briefly, the present invention provides a new and improved method of obtaining a measure of fluid transmissibility in a subsurface formation at a location in a well bore. According to the method, data are obtained with a logging while drilling tool from the formation at the location in the well bore. Data are also obtained with a permeability logging tool from the formation at the location in the well bore, and with a viscosity logging tool from the formation at the location in the well bore. The obtained data from the logging tools are processed in a computer to obtain a measure of fluid transmissibility in the subsurface formation at the location in the well bore. During the processing steps a measure of the thickness of the subsurface formation is determined from the obtained data from the logging while drilling tool and a measure of the permeability of the subsurface formation is determined from the obtained data from the permeability logging tool. A measure of the viscosity of fluid in the subsurface formation is obtained from the obtained data from the viscosity tool. The fluid transmissibility in the subsurface formation at the location in the formation is determined based on the determined measures of the thickness, permeability and viscosity.

The present invention also provides a new and improved data processing system for forming a measure of transmissibility of fluid in a subsurface formation at a location in a well bore. The data processing system includes a data storage memory storing data obtained from the formation at the location in the well bore by a logging while drilling tool, a permeability logging tool, and a viscosity logging tool. The data processing system also includes a processor for processing the stored data obtained from the logging tools to obtain a measure of fluid transmissibility in the subsurface formation at the location in the well bore. The processor determines a measure of the thickness of the subsurface formation from the stored data obtained from the logging while drilling tool, and also determines a measure of the permeability of the subsurface formation from the stored data obtained from the permeability logging tool. The processor determines a measure of the viscosity of fluid in the subsurface formation from the stored data obtained from the viscosity tool, and determines the fluid transmissibility in the subsurface formation at the location in the formation based on the determined measures of the thickness, permeability and viscosity.

The present invention further provides a new and improved data storage device having stored in a non-transitory computer readable medium computer operable instructions for causing a data processing system to form a measure of fluid transmissibility in a subsurface formation at a location in a well bore. The instructions stored in the data storage device causing the data processing system to store in a data storage memory data obtained from the formation at the location in the well bore by a logging while drilling tool, a permeability logging tool, and a viscosity logging tool. The instructions stored in the data storage device also cause the data processing system to process the stored data obtained from the logging tools to obtain a measure of fluid transmissibility in the subsurface formation at the location in the well bore by performing determining a measure of the thickness of the subsurface formation from the stored data obtained from the logging while drilling tool and determining a measure of the permeability of the subsurface formation from the stored data obtained from the permeability logging tool. The stored instructions cause the data processing system to determine a measure of the viscosity of fluid in the subsurface formation from the stored data obtained from the viscosity tool, and determine the fluid transmissibility in the subsurface formation at the location in the formation based on the determined measures of the thickness, permeability and viscosity.

BRIEF DESCRIPTION OF THE DRAWINGS

FIG. 4 is a functional block diagram of a set of data processing steps performed in the computer system of FIG.

3 during the forming of flow profile models for subsurface earth formations according to the present invention.

DETAILED DESCRIPTION OF THE PREFERRED EMBODIMENTS

Figure 1:
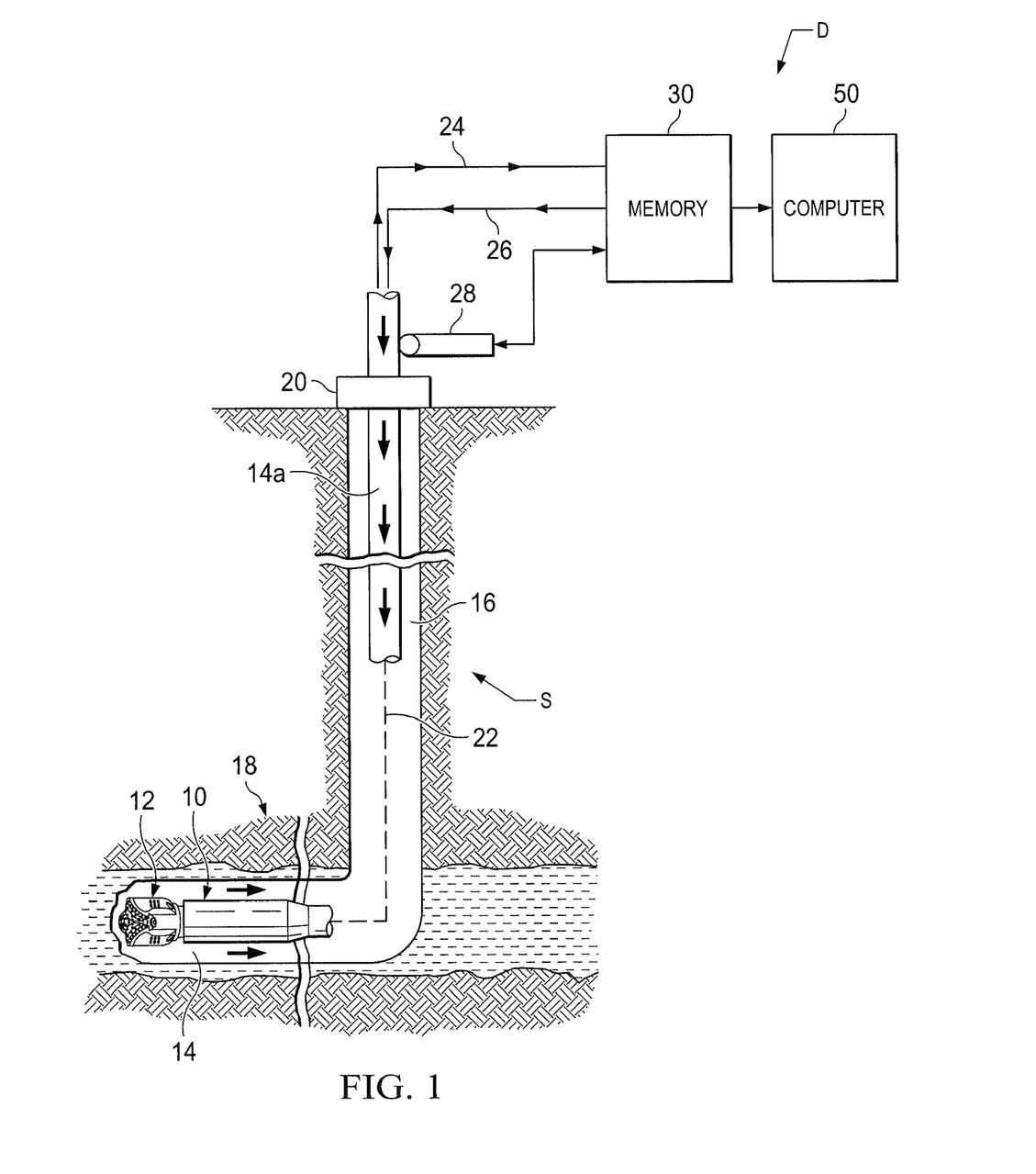
FIG. 1 is a schematic diagram, taken partly in cross-section, of a logging while drilling system disposed in a well borehole to obtain well log data for the present invention.

In the drawings, FIG. 1 illustrates an example of a logging-while-drilling (LWD) system S for gathering data about subsurface formations during drilling. The system S may be one of several commercially available types used during drilling operations at a wellsite to gather data. Once the data has been obtained, it is then available for processing in a manner to be set forth according to the present invention. The system S includes as a part of the drilling rig a downhole subassembly 10 that moves within a borehole 14 behind a drill bit 12. The subassembly 10 is connected at a lower end of a drill string 16 during drilling of the borehole 14. The downhole subassembly 10 is preferably positioned as close as practical to the drill bit 12.

Figure 2:
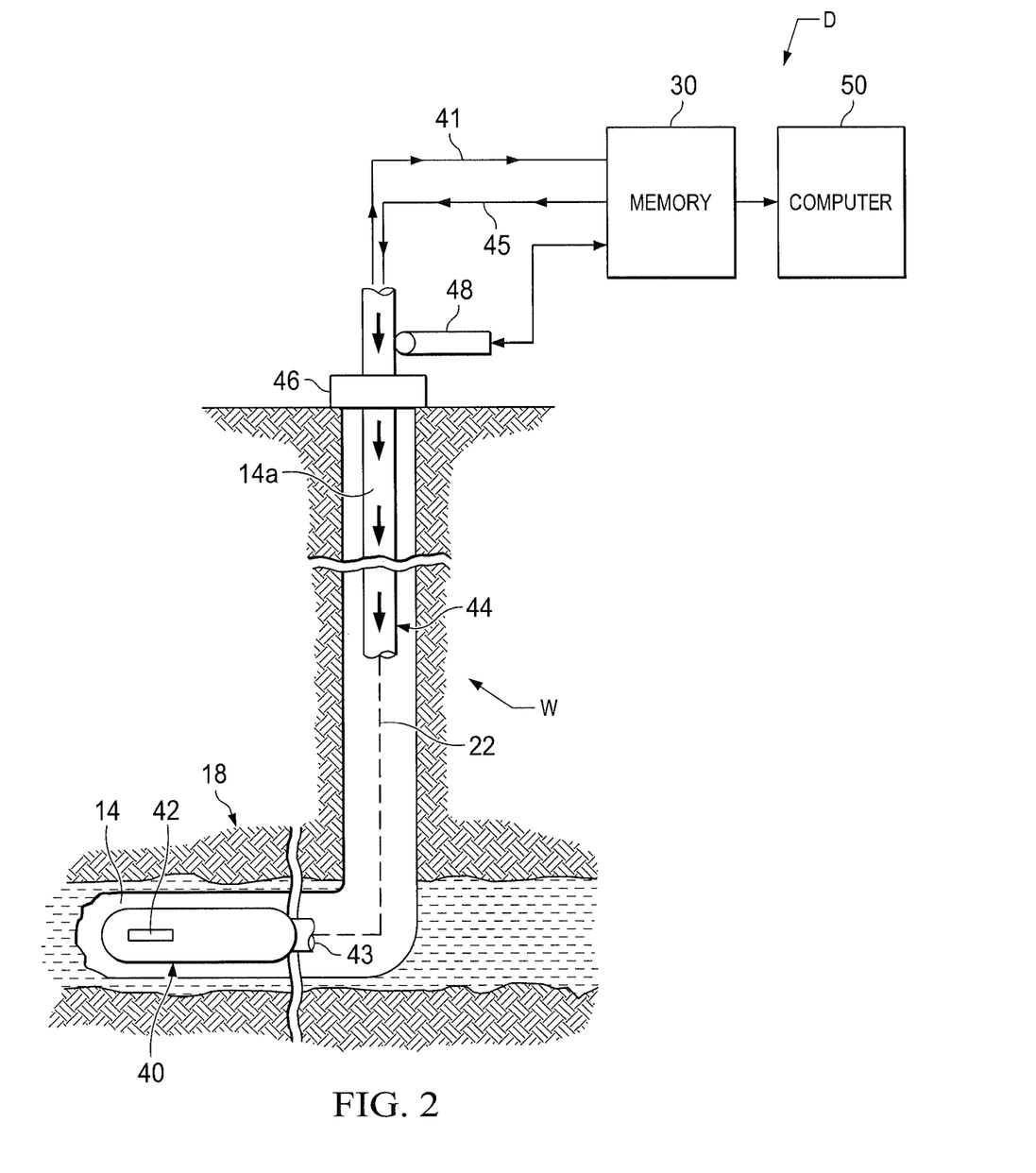
FIG. 2 is a schematic diagram, taken partly in cross-section, of another well logging system disposed in a well borehole to obtain well log data for the present invention.

Although the well 14 is illustrated in FIGS. 1 and 2 as what is known as a horizontal well, it should be understood that the modeling of flow profiles according to the present invention is performed for subsurface formations through which other types of well bores extend. The embodiment in FIGS. 1 and 2 showing bore 14 as generally horizontal is given only by way of illustrative example.

As shown in FIG. 1, the drill bit 12 and the borehole 14 have during the progress of drilling transitioned from an initial vertical direction from an upper borehole portion 14a to a generally horizontal path into a subsurface earth formation 18 containing hydrocarbons of interest and located among other non-hydrocarbon bearing formations in the earth.

The drill bit 12 may be rotated in several ways during drilling operations. The drill bit 12 may be rotated by a downhole motor which may be contained in a downhole subassembly 10. The drill bit 12 may also be driven by rotating the drill string 16 by a surface prime mover 20 to drill the borehole 14 in the earth formations 18. For simplicity, the prime mover and other components of the surface drilling rig are not shown. The downhole assembly 10 contains various sensors and devices of the conventional type for gathering data and receiving signals from the wellhead during drilling operations. If desired, a conventional measuring-while-drilling or MWD system may be used in place of the LWD system 10.

Well logging data from the downhole subassembly 10 are telemetered by a downhole telemetry system (not shown) in the downhole subassembly 10 to an uphole data processing system D. The uplink data telemetry path is indicated by a phantom or broken line 22 in the boreholes 14 and 14a and by communication lines indicated schematically at 24 and 26. Data from the downhole subassembly 10 are received and stored as functions of borehole depth by conventional uphole telemetry in a suitable data memory 30 including a data records unit and a data input unit. The data received from the downhole subassembly 10 and stored in the memory 30 are then available for processing in the data processing system D.

The telemetry system utilized in the present invention may be of several conventional, commercially available types, including either MWD or LWD well telemetry systems. It should also be understood that there are several commercially available well telemetry systems which are capable of providing well data about formation parameters of interest derived from well drilling as the well is being drilled that may be used for gathering data. Once the data are gathered, they are available for processing according to the present invention.

The data processing systems D of each of FIGS. 1 and 2 receive and process the data of interest such that the parameters of interest are recorded and displayed in the desired manner which is usually a plot of the parameters of interest as a function of depth within the borehole at which they are determined. The data processing systems D also typically receive input data from the data memory unit 30 which are telemetered downhole in the conventional manner by a downlink telemetry path denoted by the broken line 22 to the downhole subassembly 10. The LWD system 10 also includes a surface depth measurement system, such as a depth measure wheel and associated circuitry 28. A depth measurement system (not shown) also is typically included in the downhole subassembly 10 which enable a downhole computer to more accurately correlate or compute various sensor measurements and parameters of interest to their respective depths or true locations within the borehole 14 at which such measurements are made.

The LWD data from the downhole subassembly 10 are subjected to conventional preprocessing and recorded as functions of borehole depth in the data memory 30. Once recorded, the LWD data measurements are available for processing and transferred as needed into the data processing system D.

The LWD data are processed by data processing system D to obtain well logs based on the types of measurements made in the downhole subassembly 10. Among the data available from the LWD data logs are measures of the thickness of the formation 18 of interest and measures of the porosity of formation as a function of depth, a porosity log. The formation thickness and porosity log data obtained from the LWD data from the well bore 14 in formation 18 are then available for processing in the data processing system D according to the present invention in a manner to be set forth below.

In FIG. 2 of the drawings, a conventional well logging system W is shown in FIG. 2 in the well 14. The well logging system W is a separate type of logging system that the LWD logging system S of FIG. 1 and is used to obtain further data measurements for additional well logs from the well bore 14 in formation 18 which are in turn processed in accordance with the present invention. A sonde or logging tool housing 40 containing one or more conventional types of well logging instruments 42 is connected at a lower end of a conductive wireline cable 43 which is routed or ported through drill tubing or pipe 44 to which the sonde 40 is attached. The wireline cable 43 permits transfer of signals and data in each direction between the well logging instruments 42 and surface electronics, as indicated schematically at 41 and 45.

The sonde 40 is advanced at the lower end of the tubing 44 into the well bore 14 to obtain the responses to the well logging instruments 42 of subsurface formations including the formation 18 of interest. According to the present invention, the following types of well logging measurements can be obtained by instruments 42 from the subsurface formation: an NMR or nuclear magnetic resonance log; a permeability or electrofacies log; a resistivity log, e.g. induction log, laterolog; a gamma ray log; and a porosity log, e.g. density log, neutron log, sonic log. It should be understood that the sonde 40 need not contain all of these logging instruments, and may contain one or more of such instruments. In the latter case, sufficient logging passes are made with different well logging tools to obtain well logging measurements of all desired types for formation depths of interest.

During the well logging runs, the sonde 40 and tubing 44 are supported and advanced in the well by a tubing injector 46. A depth measuring sensor 48 forms a measure of the length of tubing 44 inserted into the well. The well logging measurements obtained by the well logging instruments in the sonde 40 are recorded as functions of borehole depth as provided by sensor 48 in a suitable data memory unit such as a unit 30 like that of FIG. 1. Once recorded, the well logging data measurements are then available for processing and transferred as needed into the data processing system D.

The logging data from logging instruments 42 in the sonde 40 are processed by data processing system D to obtain well logs based on the types of measurements made by the logging instruments. Among the data available form the logging instruments are: measures of the viscosity of the fluid as a function of depth in the well and the formation 18 of interest, a viscosity log; and measures of the permeability of formation as a function of depth in the well and the formation 18 of interest, a permeability log. The viscosity log is typically obtained from data obtained by an NMR log, and the permeability log is typically obtained from data obtained by an electrofacies log. The viscosity log and permeability log data obtained from the well log data from the well bore 14 in formation 18 are then available for processing in the data processing system D according to the present invention in a manner to be set forth below. Measures of formation water saturation can be determined based on data obtained from a resistivity log.

It should also be understood that the processed LWD and well log data measurement obtained may, if desired, be transmitted by satellite or other suitable telemetry link for processing according to the present invention by a computer located at an office or other facility which is considerably distant from the area of the well being drilled or logged.

In any case, the data processing system D at the well site, or the computer at a remote office, accesses the logging data measurements obtained in the system S (FIG. 1) and the system W (FIG. 2) to undertake the logic of the present invention and obtain a measure of transmissibility of fluid in subsurface formations, which may be executed by a processor as a series of computer-executable instructions.

Figure 3:
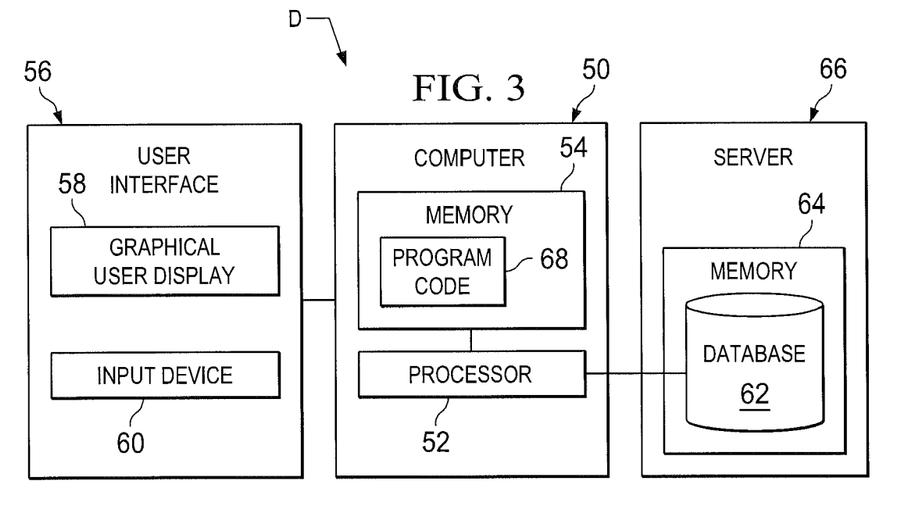
FIG. 3 is a is a schematic diagram of a computer system of FIGS. 1 and 2 for analyzing and processing well logs and other measurements in forming flow profile models for subsurface earth formations according to the present invention.

As illustrated in FIG. 3, the data processing system D of each of FIGS. 1 and 2 includes a computer 50 having a processor 52 and memory 54 coupled to the processor 52 to store operating instructions, control information and database records therein. The computer 50 may, if desired, be a multicore processor with nodes such as those from Intel Corporation or Advanced Micro Devices (AMD), or a mainframe computer of any conventional type of suitable processing capacity such as those available from International Business Machines (IBM) of Armonk, N.Y. or other source.

It should be noted that other digital processors, may be used, such as personal computers in the form of a laptop computer, notebook computer or other suitable programmed or programmable digital data processing apparatus.

The computer 50 has a user interface 56 and an output display 58 for displaying output data or records of processing of well logging data measurements performed according to the present invention to obtain a measure of transmissibility of fluid in subsurface formations. The output display 58 includes components such as a printer and an output display screen capable of providing printed output information or visible displays in the form of graphs, data sheets, graphical images, data plots and the like as output records or images.

The user interface 56 of computer 50 also includes a suitable user input device or input/output control unit 60 to provide a user access to control or access information and database records and operate the computer 50. Data processing system D further includes a database 62 stored in memory, which may be internal memory 54, or an external, networked, or non-networked memory as indicated at 64 in an associated database server 66.

The data processing system D includes program code 68 stored in memory 54 of the computer 50. The program code 68, according to the present invention is in the form of computer operable instructions causing the data processor 52 to form obtain a measure of transmissibility of fluid in subsurface formations, as will be set forth.

It should be noted that program code 68 may be in the form of microcode, programs, routines, or symbolic computer operable languages that provide a specific set of ordered operations that control the functioning of the data processing system D and direct its operation. The instructions of program code 68 may be stored in memory 54 of the computer 50, or on computer diskette, magnetic tape, conventional hard disk drive, electronic read-only memory, optical storage device, or other appropriate data storage device having a computer usable medium stored thereon. Program code 68 may also be contained on a data storage device such as server 64 as a computer readable medium, as shown.

Figure 4:
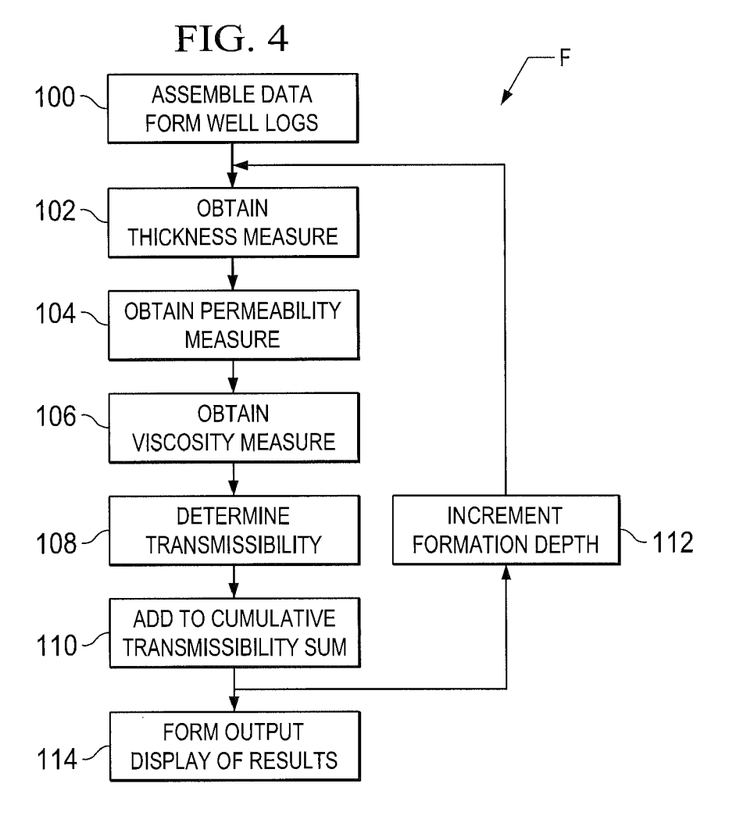

A flow chart F of FIG. 4 herein illustrates the structure of the logic of the present invention as embodied in computer program software. Those skilled in the art appreciate that the flow charts illustrate the structures of computer program code elements that function according to the present invention. The invention is practiced in its essential embodiment by computer components that use the program code instructions in a form that instructs the digital data processing system D to perform a sequence of processing steps corresponding to those shown in the flow chart F.

With reference to FIG. 4, the flow chart F is a high-level logic flowchart illustrates a method according to the present invention of forming a measure of transmissibility of fluid in subsurface formations. The method of the present invention performed in the computer 50 can be implemented utilizing the computer program steps of FIG. 4 stored in memory 54 and executable by system processor 52 of computer 50. The logging data resulting from measurements taken with the logging system S of FIG. 1 and the logging system W of FIG. 2 are provided as inputs to the data processing system D, as well as laboratory data including data regarding relative permeability of formation rock samples to oil and to water.

As shown in the flow chart F of FIG. 4, a preferred sequence of steps of a computer implemented method or process for obtaining a measure of transmissibility of fluid in a subsurface formation at a depth or location of interest in a well bore according to the present invention is illustrated schematically. During step 100, data from well logs obtained as disclosed above are assembled for further processing. Additionally, if desired, laboratory data regarding the relative permeability to oil of the formation rock and the relative permeability to water of the formation rock are provided, as will be described. As shown at step 102, a measure of the thickness h of the formation based on measurements from the LWD well logging tool 10 at the depth of interest is obtained. Then as indicated at step 104, a measure of the permeability k of the formation is obtained at the same depth of interest based on logging measurements from a well logging tool, such as from an electrofacies log obtained by instrumentation in the logging sonde 40. An example of such a logging technique is known in the art as a Facimage.

During step 106, a measure of the viscosity μ of the formation fluid is obtained at the same depth of interest, based on logging measurements from a well logging tool such as such as from an NMR log obtained by instrumentation in the logging sonde 20. Then during step 108, based on the obtained measures of the thickness h, permeability k, and viscosity μ, the transmissibility T of fluid at the particular depth of interest in the subsurface formation is determined. With the present invention, it has been found that the transmissibility measurements obtained are in effect model or pseudo flow profiles comparable in information content and accuracy to those which are available from a production logging tool or PLT.

A model flow profile is obtained by determining the transmissibility at each point or depth in the well bore where the tool is sampling. Transmissibility is a function of thickness, permeability and viscosity. The thickness, permeability and viscosity parameters obtained from logging data during steps 102, 104, and 106 are used to determine transmissibility during step 108 according to the following relationship:

$$\text{Transmissibility} = \frac{\text{Thickness}(h) \times \text{Permeability}(k)}{\text{Viscosity}(\mu)} \quad (1)$$

or $$T = \frac{h \times k}{\mu} \quad (2)$$

Thickness is obtained by knowing the sampling frequency of data measurement by the logging tool. Permeability is provided by the conventional Facimage technique. This technique is based on a mathematical and probabilistic process and model which in turn depend on wellbore logs and offset well logs to provide an accurate approximation of permeability. Viscosity is calculated as a byproduct of time relaxation measurements taken by the NMR logging tool. The parameters are processed in the data processing system D according to Equation above (2) to determine transmissibility at the corresponding depth where the log data were obtained. From bottom to top of the zone of interest in the well bore, transmissibility is cumulatively summed up and plotted as a function of depth to produce a flow profile prediction or pseudo flow profile for the zones of interest, such as that shown at 120 in FIG. 5.

Figure 5:
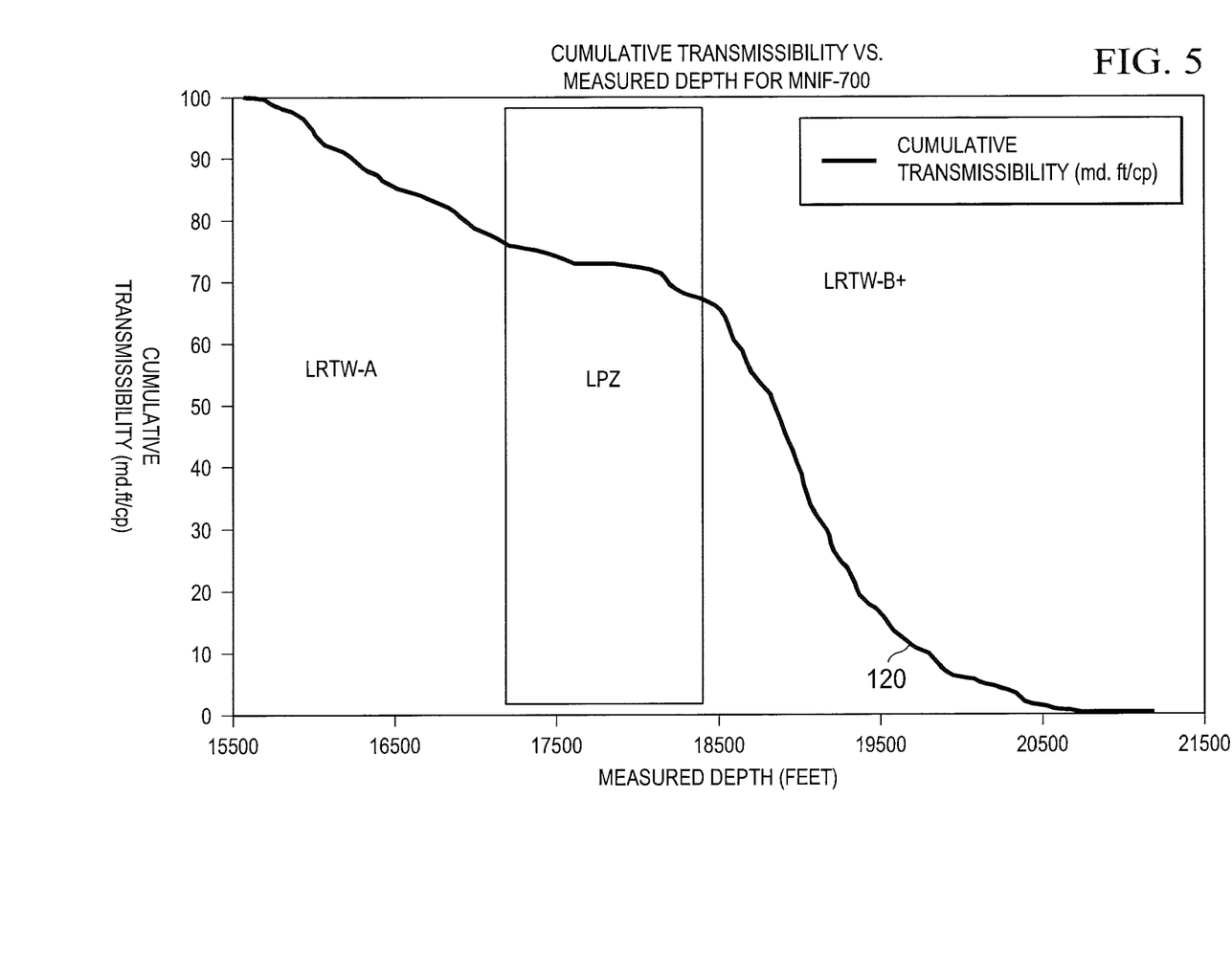
FIG. 5 is a display or plot of cumulative flow transmissibility for a subsurface formation obtained according to the present invention as a function of depth in a well bore.

Next, a comparison is made between the determined calculated pseudo flow profile, an example of which is shown at 120 in FIG. 5, with the actual flow profile for the same zone of interest. An example of an actual flow profile from a PLT log is shown at 122 in FIG. 6 along with the pseudo flow profile 120, which is the same data shown in FIG. 5.

Figure 6:
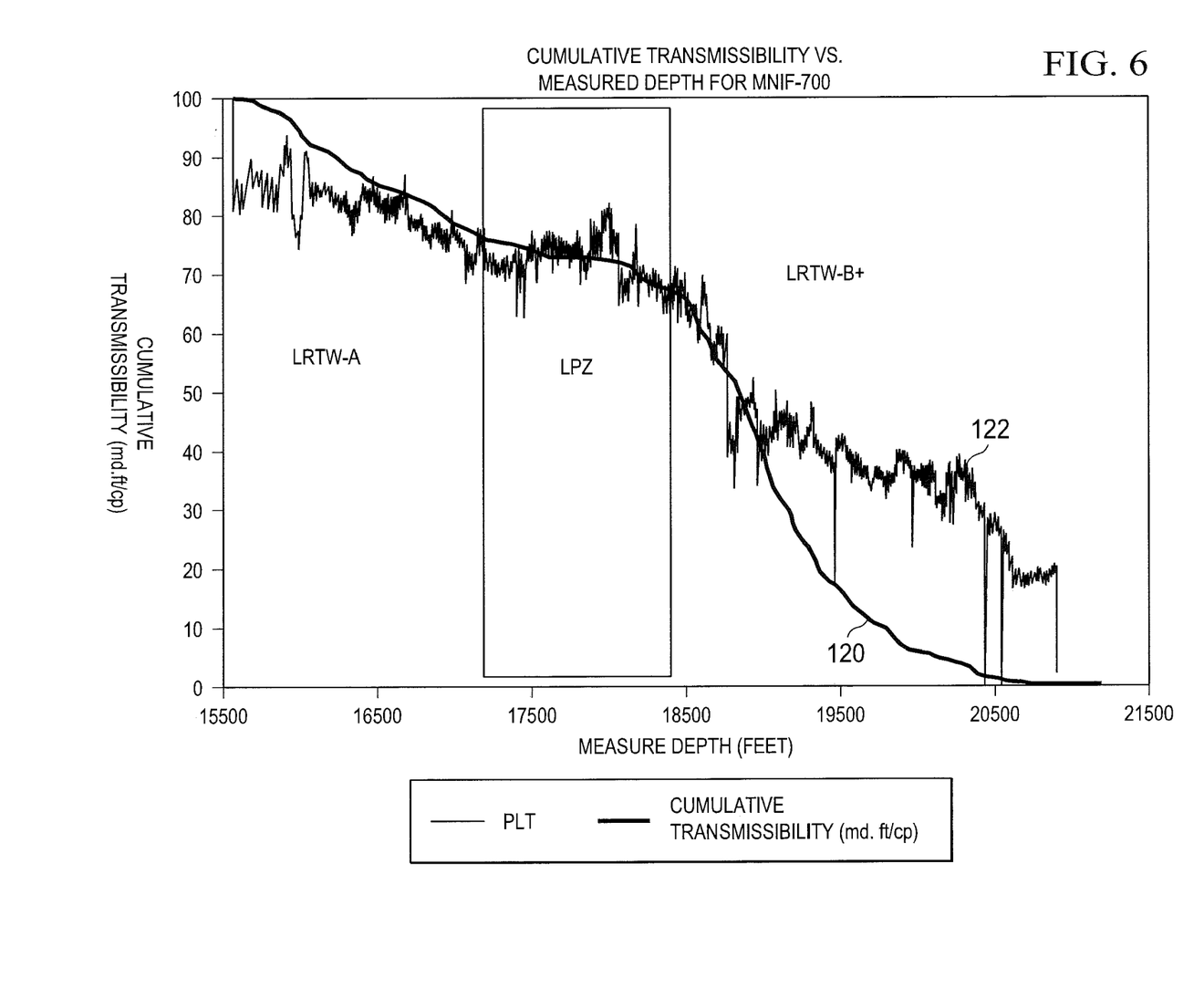
FIG. 6 is a display or comparison plot of cumulative flow transmissibility for a subsurface formation obtained according to the present invention as a function of depth, and well log data obtained from a production well logging tool or PLT.

As can be seen from FIG. 6, the pseudo flow profile 120 is not matching the actual flow profile 122. The main reason behind this difference has been determined according to the present invention to be because the relative permeability is not taken into account when processing according to Equation (2).

With the present invention relative permeability is taken into account, and this dynamic factor adjusts the flow profile model and takes into account the flow of oil and water in the well bore. Equation (2) is modified and processing of data occurs such that relative permeability is included in the determination.

Relative permeability data from laboratory tests is used in order to make the obtained transmissibility results more accurate and add a dynamic factor to the determination. In such cases, the transmissibility Equation is modified such that curves for the parameters for relative permeability to oil ($k_{ro}$) and water ($k_{rw}$) are included and transmissibility is determined separately for oil and water, as follows:

$$\text{Transmissibility of Oil} = \frac{\text{Thickness}(h) \times \text{Permeability}(k) \times \text{Relative Permeability to Oil}}{\text{Viscosity of Oil}(\mu)} \quad (3)$$

or $$T_o = \frac{h \times k \times k_{ro}}{\mu_o} = \frac{h \times k_o}{\mu_o} \quad (4)$$

$$\text{Transmissibility of Water} = \frac{\text{Thickness}(h) \times \text{Permeability}(k) \times \text{Relative Permeability to Water}}{\text{Viscosity of Water}(\mu)} \quad (5)$$

or $$T_w = \frac{h \times k \times k_{rw}}{\mu_w} = \frac{h \times k_w}{\mu_w} \quad (6)$$

Before processing the data according to the modified relations with the present invention, relative permeability is determined using porosity, permeability and, water saturation. Using porosity and permeability a term called flow zone indicator is determined and then used to determine the hydraulic unit which determines the proper relative permeability curve. Using the water saturation calculated in the logs, a value for relative permeability to oil and water can be obtained and utilized in Equations (4) and (6).

The determined transmissibility values of oil and water at depth points of interest are determined and the oil and water transmissibilty measures are then added to form a total transmissibility at the corresponding depth point during a step 110. The depth of interest is incremented to the next depth of interest as indicated at step 112, and processing returns as indicated to step 102. As indicated at step 114, the cumulative transmissibility is plotted by display 60 as a function of depth. Plotting results in a display of a measure such as that shown at 124 in FIG. 7 along with the actual flow profile 122 of FIG. 6 and the pseudo flow profile 120 of FIGS. 5 and 6.

Figure 7:
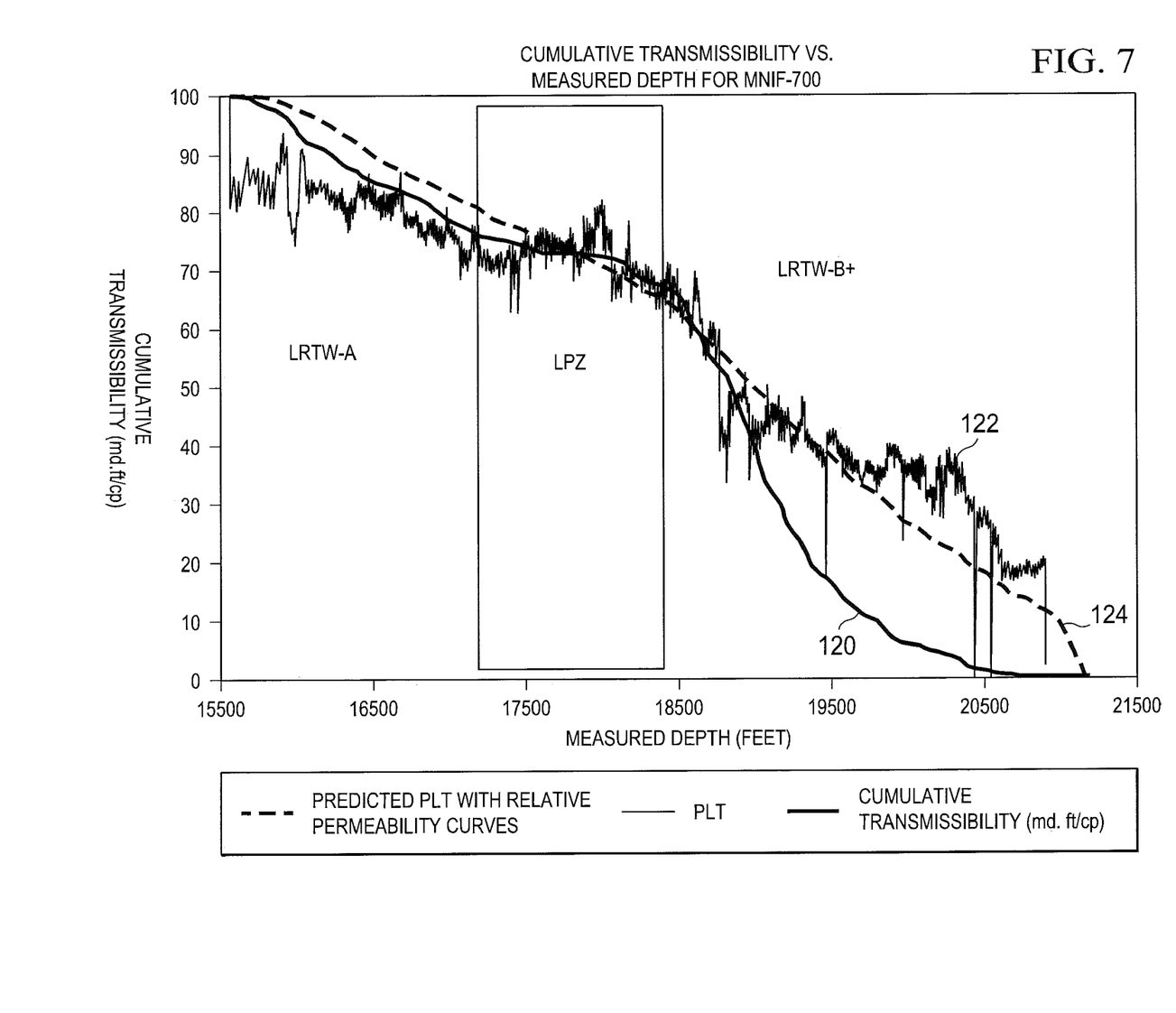
FIG. 7 is a comparison plot of the data displayed in FIG. 5 with cumulative flow transmissibilty adjusted for relative formation permeability according to the present invention.

As seen from FIG. 7, the curve 124 fits the actual plot 122 from a PLT log, which is directly a result of taking into account the relative permeability factor in the determination of the transmissibility. FIG. 7 demonstrates the importance of adding dynamic factors such as relative permeability to have more accurate results.

Figure 8A:
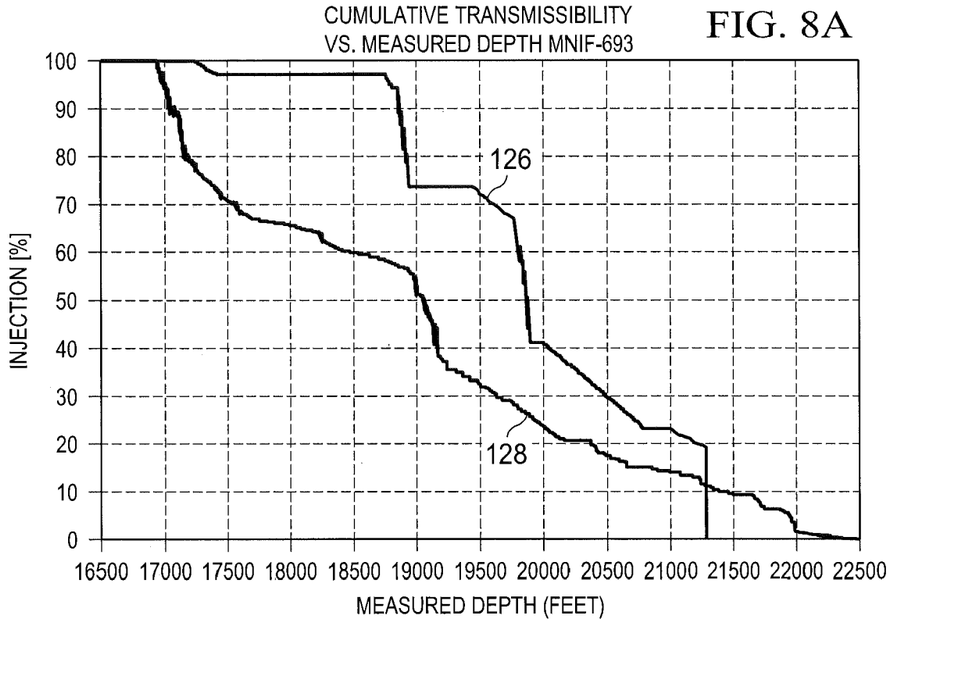
FIGS. 8A and 8B are displays or plots of flow transmissibility as a function of depth in a well bore.
Figure 8B:
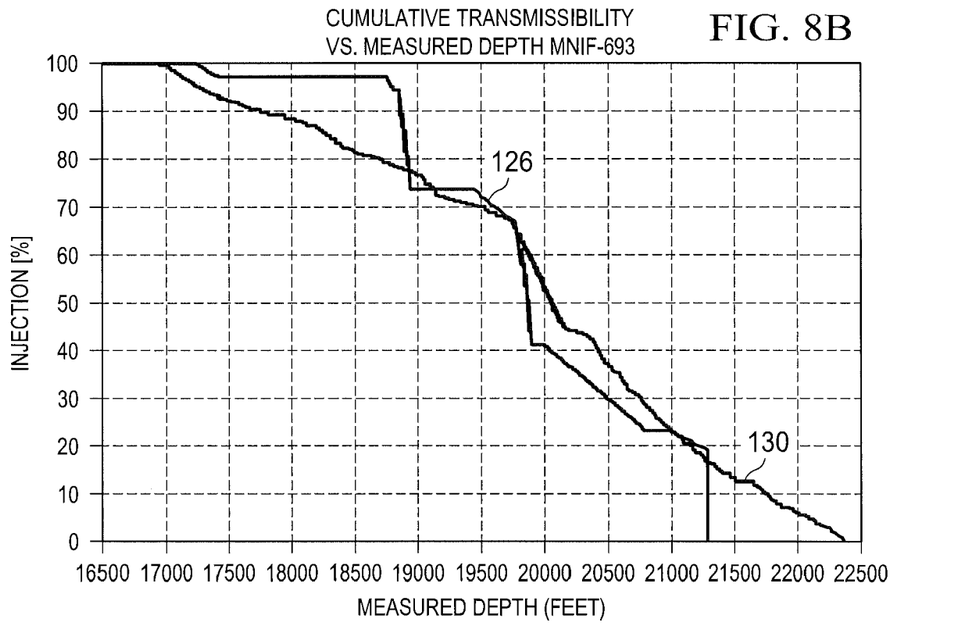

FIG. 8A is a comparison plot of data from an actual well showing cumulative transmissibility as a function of measured depth of a flow profile 126 from a conventional PLT log and a flow profile 128 which was obtained without taking relative permeability into account. FIG. 8B is a comparison plot of data from the same actual well showing the same cumulative transmissibility as a function of measured depth of a flow profile 126 of FIG. 8A from a conventional PLT log and a flow profile 130 which was obtained having taken relative permeability into account according relative permeability in determining transmissibility. Again, the flow profile 130 can be seen to better track the flow profile 126 than the results for flow profile 128 of FIG. 8A.

Figure 9:
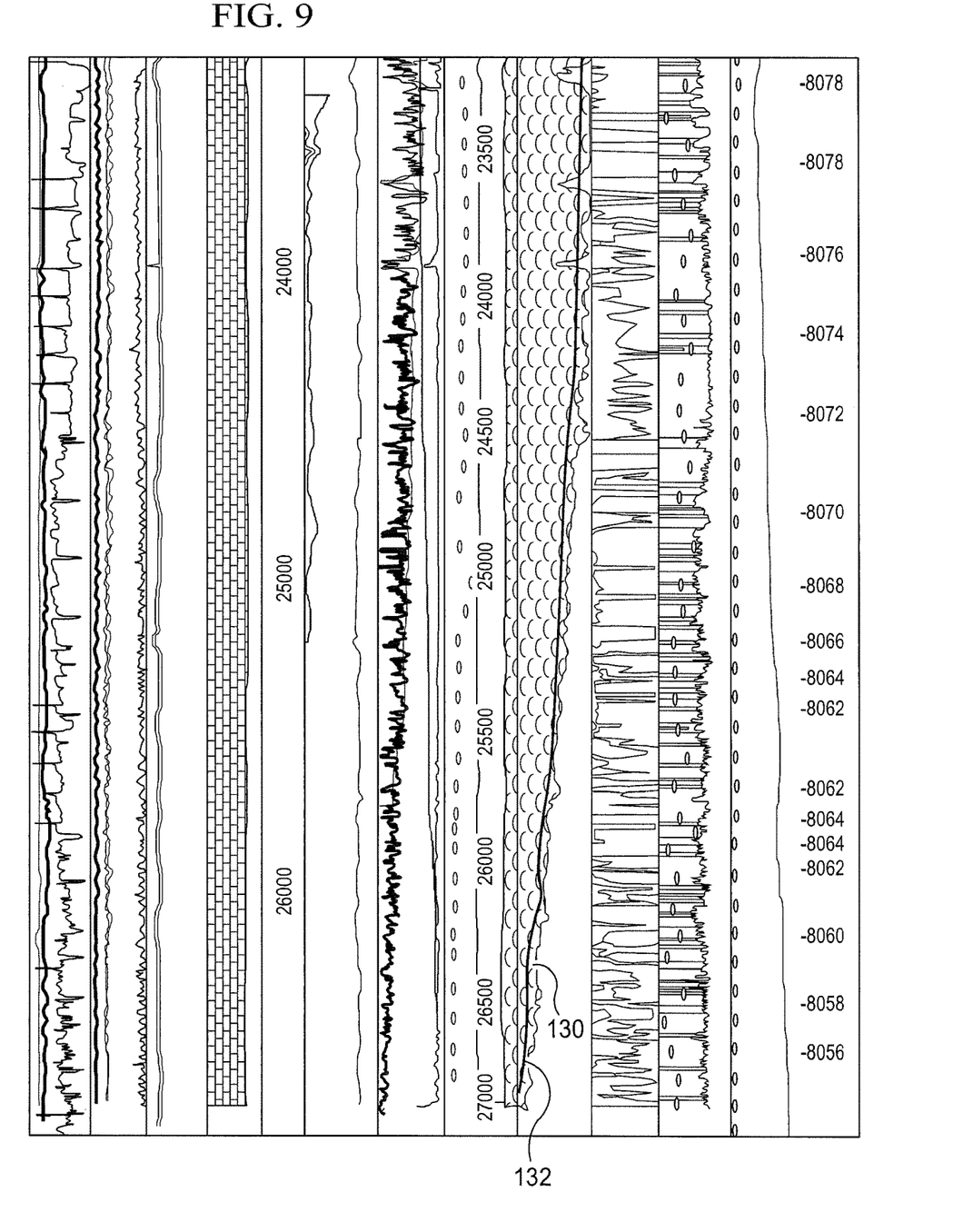
FIG. 9 is a plot of a flow profile formed according to the present invention and a flow profile obtained from a production well logging tool or PLT superimposed on a well log plot or display.

FIG. 9 is another example from an actual well to illustrate the advantages of the present invention. FIG. 9 shows a comparison plot of data obtained and plotted from a production logging tool in an actual well as indicated at 130 in FIG. 9 and a plot 132 of a pseudo flow profile formed according to the present invention. The plots 130 and 132 are superimposed over customary plots of other well log data from conventional PLT and other well logs regarding the subsurface zone of interest. As can be seen in FIG. 9, an excellent match exists between the PLT log data 130 and the flow profile 132 according to the present invention.

Utilizing the techniques of the present invention provides economic benefits due to the fact that time and resources are saved as opposed to having to run of expensive production logging tools or PLT's for every newly drilled well.

The process of forming a model or pseudo flow profile can be extended to wells that have not been drilled, or wells to be drilled in the future and improve their placement such that the best and most uniform flow can be achieved. A pseudo flow profile for a planned wells is formed utilizing data obtained from a geological model shown at 140 in FIGS. 10A and 10B of a reservoir of interest. The model may be, for example, formed in a reservoir simulator of the type described in commonly owned U.S. Pat. No. 7,809,537, or of the type known as the POWERS simulator described in the literature. See, for example articles by Dogru, A. H., et al, "A Massively Parallel Reservoir Simulator for Large Scale Reservoir Simulation," Paper SPE 51886 presented at the 1999 SPE Reservoir Simulation Symposium, Houston, Tex., February 1999 and by Dogru, A. H., Dreiman, W. T., Hemanthkumar, K. and Fung, L. S., "Simulation of Super K Behavior in Ghawar by a Multi-Million Cell Parallel Simulator," Paper SPE 68066 presented at the Middle East Oil Show, Bahrain, March 2001. In these types of models the large reservoir is organized into a number of much smaller cells of a size which provides meaningful indications regarding reservoir and formation features of interest.

A transmissibility model for oil and water is formed using Equations (4) and (6) for each cell in the model 140 in the zone of interest. Data indicative of the placement and path of the projected well is then inserted in the model, and data values retrieved for viscosity, thickness, and relative permeability to oil and water at the cell locations in the model where the trajectory of the well intersects the cells of interest. An example depth for such an intersection in the model 140 is shown at 142 in FIG. 10B.

Figure 10A:
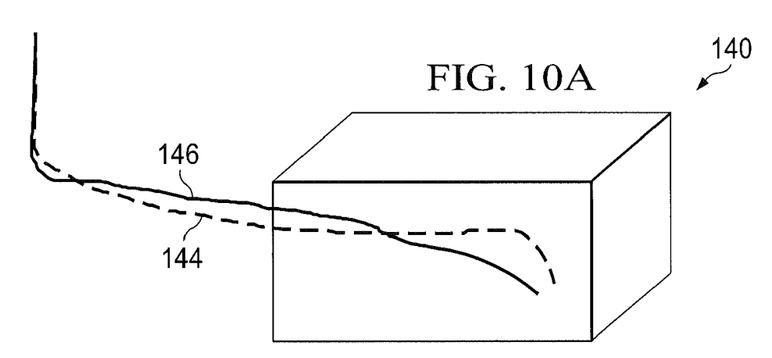
FIGS. 10A and 10B are schematic diagrams of models of computer simulations of possible placements in a portion of a subsurface reservoir.
Figure 10B:
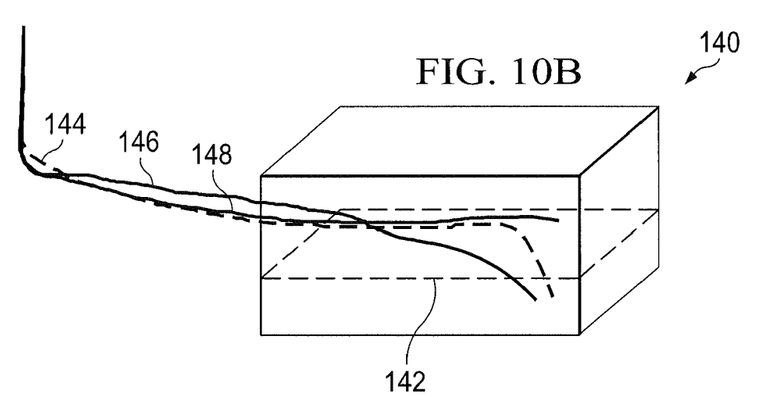

For those cell locations along the projected or planned well path, such as those indicated at 144 and 146 in FIGS. 10A and 10B, and at 148 in FIG. 10B, the transmissibility for both oil and water are determined and summed. The results are then plotted as a function of depth forming a display like that shown at 124 in FIG. 7 to obtain a predicted or simulated pseudo flow profile. The resultant flow profile is then evaluated. Alternative well placements for improved flow may be evaluated by changing well placement either vertically, horizontally or azimuthally.

The process of the present invention thus helps in better well planning, optimized well production, and minimization of the use of expensive logging tools such as NMR (Nuclear Magnetic Resonance tool). In the case of proposed water injection wells, they can be evaluated and their position adjusted to have uniform water fronts in a peripheral water injection scheme.

FIGS. 10A and 10B show schematically some possible well placements that could occur in a reservoir, using the flow prediction method according to the present invention for the model. The results can indicate which well placement or trajectory would optimize well production and thus assist in planning the drilling program accordingly.

The present invention uses field and log data, along with lab results and measurements to generate and predict Injection/Production profiles for wells of interest. The present invention thus enables reservoir engineers to measure, evaluate and compare an accurate model of transmissibility prediction to actual PLT data. This is valuable in assessment of a well's expected profile and the effectiveness of well stimulation techniques.

The present invention accumulates data acquired from the logging instrumentation in the various logging tools foot for foot of measured depth in the well. The logging data is also if desired combined with laboratory data to produce a transmissibility curve that indicates the flow profile of a well of interest with accuracy. The present invention also enables a reservoir engineer to make confident decisions about which wells require a PLT log and which wells need not, based on actual compiled data as opposed to making estimates or guesses by looking at each data component and parameter separately.

The present invention enables a reservoir engineer or analyst to compare predicted flow profiles obtained as described above with PLT data, when available, and to investigate discrepancies which might exist. Examples include those caused due to fractures, thief zones, a bad stimulation job, and the like. The present invention also provides more confidence in deciding whether or not to run a PLT log in a particular well. The present invention also provides more confidence about flow profile data from a well in situations when a decision is made not to run a PLT in the well. The present invention also saves time by avoiding delays which occur while waiting for a PLT log to be run in a well, and provides cost savings by eliminating PLT logs in cases where reservoir engineers are comfortable with the predicted flow profiles obtained with the present invention.

The invention has been sufficiently described so that a person with average knowledge in the matter may reproduce and obtain the results mentioned in the invention herein Nonetheless, any skilled person in the field of technique, subject of the invention herein, may carry out modifications not described in the request herein, to apply these modifications to a determined structure, or in the manufacturing process of the same, requires the claimed matter in the following claims; such structures shall be covered within the scope of the invention.

It should be noted and understood that there can be improvements and modifications made of the present invention described in detail above without departing from the spirit or scope of the invention as set forth in the accompanying claims.

What is claimed is:

1. A method of determining fluid transmissibility of a subsurface formation at a given depth, the method comprising the steps of:

conducting logging operations in a well bore extending into a subsurface formation to obtain thickness data, permeability data and viscosity data for the subsurface formation as a function of depth in the well bore, the logging operations comprising running a logging tool along a length of the well bore and measuring characteristics of the subsurface formation as a function of depth in the well bore as the logging tool is run along the length of the well bore, wherein the logging operations comprise:

conducting a nuclear magnetic resonance (NMR) logging operation comprising running a NMR logging tool along the length of the well bore and measuring time relaxation characteristics of the subsurface formation as a function of depth in the well bore as the NMR logging tool is run along the length of the well bore, wherein the viscosity data comprises the measurements of the time relaxation characteristics, and wherein a NMR log is generated based on the measurements of the time relaxation characteristics; and conducting a logging-while-drilling (LWD) logging operation comprising running a LWD logging tool along the length of the well bore during drilling of the well bore and measuring thickness characteristics of the subsurface formation as a function of depth in the well bore as the LWD logging tool is run along the length of the well bore during drilling of the well bore, wherein the thickness data comprises the measurements of the thickness characteristics of the subsurface formation, and wherein a thickness log is generated based on the measurements of the thickness characteristics of the subsurface formation; and a computer performing the following operations:

generating, using the permeability data, an electrofacies log for the well bore;

generating, using the viscosity data, the NMR log for the well bore;

generating, using the thickness data, the thickness log for the well bore, the thickness log for the well bore identifying a thickness of the subsurface formation as a function of depth in the well bore;

generating, using the electrofacies log for the well bore, a permeability log for the well bore, the permeability log for the well bore identifying permeability of the subsurface formation as a function of depth in the well bore;

generating, using the NMR log for the well bore, a viscosity log for the well bore, the viscosity log for the well bore identifying viscosity of the subsurface formation as a function of depth in the well bore;

determining, based on the thickness log for the well bore, a measure of a thickness of the subsurface formation at a depth in the well bore;

determining, using the permeability log for the well bore, a measure of a permeability of the subsurface formation at the depth in the well bore;

determining, using the viscosity log for the well bore, a measure of a viscosity of fluid in the subsurface formation at the depth in the well bore; and determining a fluid transmissibility of the subsurface formation at the depth in the well bore using the following relationship:

Tranmissibility=Thickness ($h$)×Permeability ($k$)/Viscosity ($\mu$)

wherein Transmissibility is the fluid transmissibility in the subsurface formation at the depth in the well bore, Thickness (h) is the measure of the thickness of the subsurface formation at the depth in the well bore determined, Permeability (k) is the measure of the permeability of the subsurface formation at the depth in the well bore determined, and Viscosity ($\mu$) is the measure of the viscosity of fluid in the subsurface formation at the depth in the well bore determined;

assessing the fluid transmissibility of the subsurface formation determined; and conducting, in response to the assessment of the fluid transmissibility of the subsurface formation determined, a production logging of the well bore to generate a production log of the well bore that comprises a profile of actual production flow in the well bore.

2. The method of claim 1, further comprising:

drilling a well at a location determined based on the fluid transmissibility of the subsurface formation.

3. The method of claim 1, further comprising determining a measure of the thickness of the subsurface formation at each of a plurality of depths in the well bore based on the thickness log for the well bore;

determining a measure of the permeability of the subsurface formation at each of the plurality of depths in the well bore based on the permeability log for the well bore;

determining a measure of the viscosity of fluid in the subsurface formation at each of the plurality of depths in the well bore based on the fluid viscosity log for the well bore; and determining a transmissibility of the subsurface formation at each of the plurality of depths in the subsurface formation based on the measures of the thickness of the subsurface formation, the permeability of the subsurface formation, and the viscosity of the subsurface formation at each of the plurality of depths in the well bore determined; and determining a cumulative fluid transmissibility of the subsurface formation based on the fluid transmissibilities at the plurality of depths in the subsurface formation determined.

4. The method of claim 3, wherein determining the cumulative fluid transmissibility of the subsurface formation based on the fluid transmissibilities at the plurality of depths in the subsurface formation determined comprises determining the cumulative fluid transmissibility of the subsurface formation by summing the fluid transmissibilities at the plurality of depths in the subsurface formation determined.

5. The method of claim 3, the processing further comprising:

determining a flow profile for the well bore, the flow profile for the well bore comprising the fluid transmissibility of the subsurface formation at each of the plurality of depths in the subsurface formation determined.

6. The method of claim 1, further comprising:
determining a transmissibility of oil at the depth based on the measure of the thickness of the subsurface formation determined, the measure of the permeability of the subsurface formation determined, and a relative permeability of oil;
determining a transmissibility of water at the depth based on the measure of the thickness of the subsurface formation determined, the measure of the permeability of the subsurface formation determined, and a relative permeability of water; and
determining a total fluid transmissibility of the subsurface formation at the depth by summing the transmissibility of oil at the depth determined and transmissibility of water at the depth determined.

7. The method of claim 6, further comprising:
identifying a plurality of cells intersected by a well trajectory, a first cell of the plurality of cells corresponding to the depth in the well bore;
determining, for each cell of the plurality of cells, a total fluid transmissibility comprising a total fluid transmissibility of the subsurface formation at a depth corresponding to the cell, the total fluid transmissibility for the first cell comprising the total fluid transmissibility of the subsurface formation at the depth determined;
determining, based on the fluid transmissibilities for the plurality of cells, a well location and a well trajectory; and
drilling a well at the well location and having the well trajectory.

8. The method of claim 6, wherein the transmissibility of oil is determined using the following relationship:

Tranmissibility of Oil=Thickness ($h$)×Permeability ($k$)×Relative Permeabilty to Oil/Viscosity of Oil ($\mu_o$)

wherein the transmissibility of water is determined using the following relationship:

Tranmissibility of Water=Thickness ($h$)×Permeability ($k$)×Relative Permeabilty to Water/Viscosity of Water ($\mu_w$)

wherein Transmissibility of Oil is the transmissibility of oil at the depth, Transmissibility of Water is the transmissibility of water at the depth, Thickness (h) is the measure of the thickness of the subsurface formation determined, Permeability (k) is the measure of the permeability of the subsurface formation at the depth determined, Relative Permeability to Oil is the relative permeability of oil, Relative Permeability to Water is the relative permeability of water, Viscosity Oil ($\mu_o$) is a fluid viscosity of oil and Viscosity Water ($\mu_w$) is a fluid viscosity of water.

9. The method of claim 1, wherein the production logging operation comprises running a production logging tool into the well bore to measure the actual production flow in the well bore.

* * * * *